United States Patent [19]

Baloche

[11] Patent Number: 5,216,936
[45] Date of Patent: Jun. 8, 1993

[54] MECHANISM FOR ADJUSTING THE BACK PORTION OF A SEAT

[75] Inventor: Francois Baloche, Flers, France

[73] Assignee: Bertrand Faure Automobile "BFA", Massy, France

[21] Appl. No.: 846,346

[22] Filed: Mar. 5, 1992

[30] Foreign Application Priority Data

Mar. 5, 1991 [FR] France .................. 91 02590

[51] Int. Cl.$^5$ ............................................. B60N 2/22
[52] U.S. Cl. ................................. 74/527; 297/363; 297/367
[58] Field of Search ............... 74/527, 531; 297/361, 297/362, 363, 367

[56] References Cited

U.S. PATENT DOCUMENTS

| | | | |
|---|---|---|---|
| 2,844,236 | 7/1958 | Cole | 74/531 X |
| 3,423,785 | 1/1969 | Pickles | 74/531 X |
| 3,570,325 | 3/1971 | Kroll et al. | 74/527 |
| 3,627,253 | 12/1971 | Hericourt et al. | 74/527 X |
| 3,793,903 | 2/1974 | Pellman | 74/531 |
| 4,038,508 | 7/1977 | Mapelsden | 74/531 X |
| 4,770,464 | 9/1988 | Pipon et al. | 297/363 X |
| 4,919,004 | 4/1990 | Nagano | 74/531 X |
| 5,161,856 | 11/1992 | Nishino | 297/363 X |

FOREIGN PATENT DOCUMENTS 594225  3/1959  Italy .................. 74/527

Primary Examiner—Richard M. Lorence
Assistant Examiner—Khoi Q. Ta
Attorney, Agent, or Firm—Robert W. Becker & Associates

[57] ABSTRACT

An adjusting mechanism for the back portion of a seat comprises a fixed circular flange attached to an armature of the sitting portion of the seat. The fixed flange has a cup-shaped recess and cutouts spaced at 120° from one another. Each cutout contains a block with an outer toothing. The blocks are resting on block-pushing members each provided with a finger facing the mobile flange. The block-pushing members rest on a cam with three steps. The fingers of the block-pushing members cooperate with a release ring housed inside the mobile flange and having three projections provided for pushing the block-pushing members toward the center of the adjusting mechanism when the cam is pivoted in a direction for moving the back portion of the seat onto the sitting portion.

5 Claims, 1 Drawing Sheet

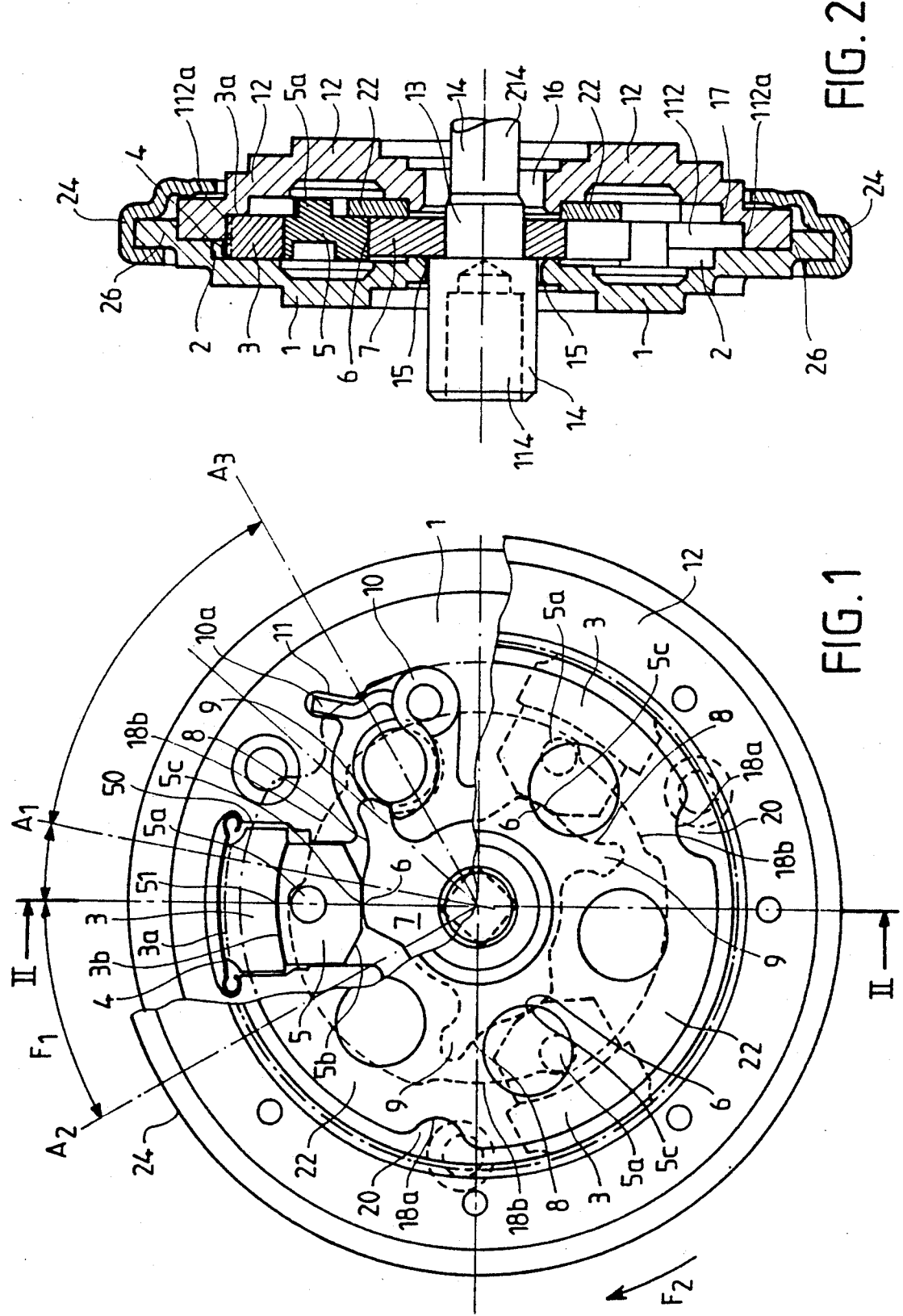

MECHANISM FOR ADJUSTING THE BACK PORTION OF A SEAT

BACKGROUND OF THE INVENTION

Upon demand of customers, the car manufacturers present more and more vehicle models in a so-called three-door vehicle type with two side doors and a hatch-back. Actually, this construction provides vehicles of a smaller length which are more suitable in city traffic, while permitting however the transportation of at least four persons since the rear portion of the vehicle is provided with a single back seat or the like.

However, the above type of vehicles requires necessarily side doors of a great length in order to make it easier for the rear passengers to get in and out of the vehicle.

But it is also necessary to provide front seats (for the driver and front passenger) with the back portions foldable onto the sitting portions so as to permit an easy passage of the rear passengers, both in getting into and out of the vehicle.

It has been known for a long time to provide the back portions of the front seats of vehicles so as to be adjustable in their inclination for providing a maximum comfort for the driver and the front passenger.

Articulation mechanisms enabling such adjustments in inclination of the back portion are therefore conventional means. These mechanisms can also be designed in such a manner as to allow the folding of these back portions onto the sitting portions, with an additional memory member for returning the back portion into its correct position once the rear passengers have entered or exited from the vehicle being provided. However all these adjusting devices are complex and therefore very expensive.

This is particularly the case for the devices shown in EP-A-0,250,290 (Cousin) and FR-A-2,231,538 (Keiper), with the latter prior art document disclosing a positioning means using toothed blocks locked into the toothing of a ring by means of a cam which is returned on latching by means of curved slots actuating them via pins rigidly connected to these blocks. But nothing in this known arrangement retains the blocks over a certain angular range in order to keep them disengaged with the toothing of the ring.

Car manufacturers have long been searching for a very reliable, simple and rather cheap mechanism, which is mountable on various types of seats and which has the following necessary basic functions: i) an adjustment of the inclination of the seat back portion with respect to the sitting portion, and ii) a rapid folding of the back portion onto the sitting portion with a memory member for returning the seat back portion to its correct position once the vehicle rear passengers have entered or exited the vehicle.

Finally, these mechanisms have to be embodied such as to be adaptable to various types of vehicles and to be controllable in a simple manner, both for the adjustment in inclination of the back portion and for folding the back portion onto the sitting portion.

Moreover, these mechanisms must be free of any notable play so as to avoid discomfort for the passenger sitting on the respective seat.

SUMMARY OF THE INVENTION

The mechanism of the present invention meets entirely these requirements by providing means which are simple, cheap, and also very reliable, even when there is an accident, and which do not have any notable play.

According to the present invention, the adjusting mechanism comprises a shaft and a cam mounted on the shaft, the cam having three steps with elongations and a recessed section between the steps and the elongations; a circular fixed flange having a cup-shaped recess of a first diameter, three cutouts, three cutout portions, and a circular recess of a second diameter which is greater than the first diameter, the cutouts being spaced at an angle of 120° from one another and the three cutout portions being spaced at an angle of 120° from one another, the three cutout portions being staggered relative to the cutouts, and the circular fixed flange having a central opening for receiving the shaft; a circular mobile flange connected to the circular recess and having a stepped recess; a block being disposed in each one of the cutouts and having a radially outwardly oriented toothing; a block-pushing member coordinated with the block and resting with a radially outwardly oriented face at the block and with a radially inwardly oriented face at the cam, the block-pushing member having a finger facing the circular mobile flange; three springs in the form of a figure eight, with a free end of each one of the springs being positioned in a respective cutout portion of the circular fixed flange, each elongations of the cam resting at one of the springs; and a release ring connected to the circular mobile flange, having three radially inwardly oriented projections cooperating with the fingers for forcing the block-pushing members radially inwardly when the cam is turned against the force of the springs.

In a preferred embodiment, the release ring has recessed portions at an outer circumference thereof and the circular mobile flange has bosses cooperating with the recessed portions to secure the release ring.

It is advantageous that a leaf spring positioned at a radially outwardly oriented face of the block within the cutout is provided for biasing the block radially inwardly.

Furthermore, it is expedient that a sleeve for positioning and centering the cam between the circular fixed flange and the circular mobile flange is provided.

It is preferred that the circular mobile flange is provided with teeth at a radially inward oriented surface of the stepped recess, whereby the teeth cooperate with the toothing of the blocks.

BRIEF DESCRIPTION OF THE DRAWINGS

An embodiment of the invention is shown by way of a non limiting example in the accompanying drawings, wherein:

FIG. 1 is a partly cut away front elevational view of the mechanism for adjusting the back portion of a seat; and FIG. 2 is a diametrical cross-sectional view of FIG. 1, taken along line II—II of FIG. 1.

DESCRIPTION OF PREFERRED EMBODIMENT

Referring now to the drawings, the adjusting mechanism of the inclination of a seat back portion is essentially made of a fixed flange 1 which is attached by connecting members (not shown) to the armature of the sitting portion.

The inner side of the flange 1 has a recess in the shape of a cup 2 in which three toothed blocks 3 are placed at an angle of 120° to one another.

The blocks 3 are permanently biased toward the center of the flange 1 by leaf springs 4 of a small width, so that the toothed upper portion 3a of the blocks 3 is partly disengaged.

The blocks S bear normally against a set of block-pushing members 5, each having a finger 5a.

The blocks 3 and the block-pushing members 5 are held, inside the fixed flange 1, in cutouts 50 provided for this purpose.

The block-pushing members 5 are spaced apart by 120° with respect to one another, as are the blocks 3, and are tapered at their radially inwardly oriented end portion 5b to form a substantially flat face 5c which is in engagement with a step 6 of a cam 7. The cam 7 has three steps 6, also spaced apart by an angle of 120°. The steps 6 each have a recessed section 8 which are also spaced apart by 120° relative to one another. The steps 6 extend into elongations or shanks 9, also spaced apart by 120° and forming the radially outermost points of the cam 7.

Each shank 9 is subjected to the action of a return spring 10 having preferably the shape of a figure eight. The radially outer end 10a of the spring 10 is housed inside a cutout portion 11 formed in the inner surface of the fixed flange 1 of the articulation mechanism.

It should be noted that the radially outward faces 51 of the block-pushing members 5 are slightly convex, while the corresponding faces 3b of the toothed blocks 3 are concave.

The cam 7 is centered on a sleeve 13 of a shaft 14 extending through a central opening 15 formed in the center of the fixed flange 1.

The shaft 14 extends through a circular recess 16 formed in the center of the mobile flange 12.

The flange 12 has a recess 17 in which a release ring 22 is housed which is held inside the recess 17 by bosses 20 rigidly connected to the mobile flange 12. The bosses 20 are spaced apart by 120° with respect to one another and extend into recessed portions 18a of the release ring 22 so as to keep the release ring 22 rigidly connected with the mobile flange 12.

The inner face of the release ring 22 has three projections 18b with rounded outer edges, for cooperating with the fingers 5a of the block-pushing members 5 carrying the blocks 3.

Finally, the release ring 22 is centered with respect to the circular recess 16. The release ring 22 holds the block-pushing members 5 and the cam 7 in position during releasing and forward tilting of the seat back portion, thereby avoiding the necessity for a continuous unlatching control during the angular movement of the seat back portion.

In a conventional manner, the mobile flange 12 is connected to the fixed flange 1 via a crimped hollow ring 24 which holds the outer peripheral edge of the mobile flange 12 in a circular recess 26 formed inside the fixed flange 1.

In the present case, the mobile flange 12 slides inside the fixed flange 1 due to the precision-ground surfaces of the circular recess 26 and of the outer periphery of the flange 12. It is also possible to provide, in a manner known per se, a roller bearing or a needle bearing between the circular recess 26 of the fixed flange 1 and the outer periphery of the mobile flange 12.

The mobile flange 12 includes also, in a manner known per se, connection members (not shown) for providing a connection with the lower portion of the armature of the seat back portion.

The rotation control of the shaft 14 for providing the angular rotation of the cam 7 may be obtained either manually via the shaft recess 114, or mechanically, electrically, or pneumatically via the central portion 214 of the shaft 14.

It should also be noted that the stepped recess 112 of the mobile flange 12 carries, on its radially inward face 112a, a toothing adapted for cooperating with the toothed portion 3a of the blocks 3 which are housed in the cutouts 50.

In FIG. 1, the articulation mechanism is in a latched position since the toothed portion 3a of the blocks 3 is in engagement with the toothing 112a of the mobile flange 12.

The fingers 5a of the block-pushing members 5 are placed against projections 18b of the ring 22, and the block-pushing members 5 rest with their radially inwardly oriented face 5a on the steps 6 of cam 7.

When it is desired to move the seat back portion, for example, from the normal position as shown by the line A1 in FIG. 1, to a folded-over position on the sitting portion in the direction of arrow F1, as shown by the line A2, the block-pushing members 5 are unlatched by rotating the cam 7 in direction of the arrow F2.

The effect of the above movement is the stressing of the return spring 10 since the elongations or shanks 9, according to the direction of the arrow F2, will compress the return springs 10.

The block-pushing members 5, which then rest on the recessed section 8 of the cam 7, can therefore move backward toward the shaft 14, and are held in this position by the projections 18b of the release ring 22.

The blocks 3 are biased toward the center by the leaf springs 4, and the toothing 112a of the mobile flange 12 is therefore disengaged.

The seat back portion can therefore be easily moved frontwardly about an angle equal to 30° (corresponding to the length of the projection 18b) to the position shown at A2.

Meanwhile, it is not necessary to act on the control member placed on the shaft 14 since the fingers 5a of the block-pushing members 5 are kept in a radially inwardly oriented position by the projections 18b of the release ring 22.

This movement is followed by a return of the seat back portion to the normal position when the passengers have entered or exited the rear of the vehicle. The seat back portion then returns to the position indicated by the line A1. This means that the cam 7 returns to its latching position shown in FIG. 1, the block-pushing members 5 and the blocks 3 return also to their position shown in FIG. 1, and the teeth of the blocks 3 engage again the toothing 112a of the mobile flange 12, whereby the springs 10, by being decompressed, favor the return movement of the seat back portion.

If it is desired to obtain a different adjustment of the inclination of the seat back portion, for example, toward the line A3, the block-pushing members 5 are temporarily unlatched by pivoting the cam 7 in direction of the arrow F2. The fingers 5a then move radially inwardly and free the blocks 3. The position of the seat back portion is then selected in the direction of the line A3. When the seat back portion reaches the selected position, the cam 7 is released and returns to its normal position, so that the blocks 3 engage again the toothing 112a of the mobile flange 12.

The present invention is, of course, in no way restricted to the specific disclosure of the specification and drawings, but also encompasses any modifications within the scope of the appended claims.

What I claim is:

1. An adjusting mechanism for a back portion of a seat, said mechanism comprising:

a shaft;

a cam mounted on said shaft, said cam having three steps with elongations and a recessed section between said steps and said elongations;

a circular fixed flange having a cup-shaped recess of a first diameter, three cutouts, three cutout portions, and a circular recess of a second diameter greater than said first diameter, said cutouts being spaced at an angle of 120° from one another and said three cutout portions being spaced at an angle of 120° from one another, said three cutout portions being staggered relative to said cutouts, said circular fixed flange having a central opening for receiving said shaft;

a circular mobile flange connected to said circular recess and having a stepped recess;

a block being disposed in each said cutouts and having a radially outwardly oriented toothing;

a block-pushing member coordinated with said block and resting with a radially outwardly oriented face at said block and with a radially inwardly oriented face at said cam, said block-pushing member having a finger axially facing said circular mobile flange;

three torsion springs in the form of a figure eight, with a free end of each said spring being positioned in a respective one of said cutout portions of said circular fixed flange, each said elongations of said cam resting at one of said springs; and a release ring connected to said circular mobile flange, having three radially inwardly oriented projections cooperating with said fingers for forcing said block-pushing members radially inwardly when said cam is turned against the force of said springs.

2. An adjusting mechanism according to claim 1, wherein said release ring has recessed portions at an outer circumference thereof and wherein said circular mobile flange has bosses cooperating with said recessed portions to secure said release ring.

3. An adjusting mechanism according to claim 1, further comprising a leaf spring positioned at a radially outwardly oriented face of said block within said cutout for biasing said block radially inwardly.

4. An adjusting mechanism according to claim 1, further comprising a sleeve for positioning and centering said cam between said circular fixed flange and said circular mobile flange.

5. An adjusting mechanism according to claim 1, wherein said circular mobile flange is provided with teeth at a radially inward oriented surface of said stepped recess, said teeth cooperating with said toothing of said blocks.

* * * * *